(12) United States Patent
Wenger et al.

(10) Patent No.: US 8,577,738 B2
(45) Date of Patent: Nov. 5, 2013

(54) METHOD AND SYSTEM OF PROVIDING AN OPTIMIZED OFFER

(76) Inventors: Michael Wenger, Oswego, IL (US);
Bret Bonnet, North Aurora, IL (US)

( * ) Notice: Subject to any disclaimer, the term of this patent is extended or adjusted under 35 U.S.C. 154(b) by 0 days.

(21) Appl. No.: 13/169,455

(22) Filed: Jun. 27, 2011

(65) Prior Publication Data

US 2012/0330776 A1 Dec. 27, 2012

(51) Int. Cl.
*G06Q 30/00* (2006.01)
(52) U.S. Cl.
USPC ....... 705/26.1; 705/27.1; 705/7.22; 705/7.25; 705/7.31; 705/7.35
(58) Field of Classification Search
USPC ............ 705/26.1–27.2, 7.22, 7.25, 7.31, 7.35
See application file for complete search history.

(56) References Cited

U.S. PATENT DOCUMENTS 7,747,473 B1 * 6/2010 Mesaros ...................... 705/26.2

OTHER PUBLICATIONS

Rogers, P., & Flanagan, M. T. (1991). On-line simulation for real-time scheduling of manufacturing systems. Industrial Engineering, 23(12), 37-37.*

* cited by examiner

*Primary Examiner* — Jeffrey A Smith
*Assistant Examiner* — Resha Desai
(74) *Attorney, Agent, or Firm* — Richards Patent Law P.C.

(57) ABSTRACT

An ecommerce cost optimization system includes: a display including information identifying an item; a quantity selection tool; a delivery location selection tool; an optimized offer presentation tool that provides at least one optimized option through the display component, wherein the at least one optimized option is optimized based on the selected quantity and the selected delivery location; and an order placement tool to place an order from amongst the options provided by the optimized offer presentation tool. A method of providing optimized offer for non-stock item transactions through an ecommerce application includes receiving a user selection including a selected quantity of the item and a selected delivery location and determining an optimized offer based on analysis of the possible combinations of a production schedule and a delivery schedule for the selected quantity and delivery location.

9 Claims, 3 Drawing Sheets

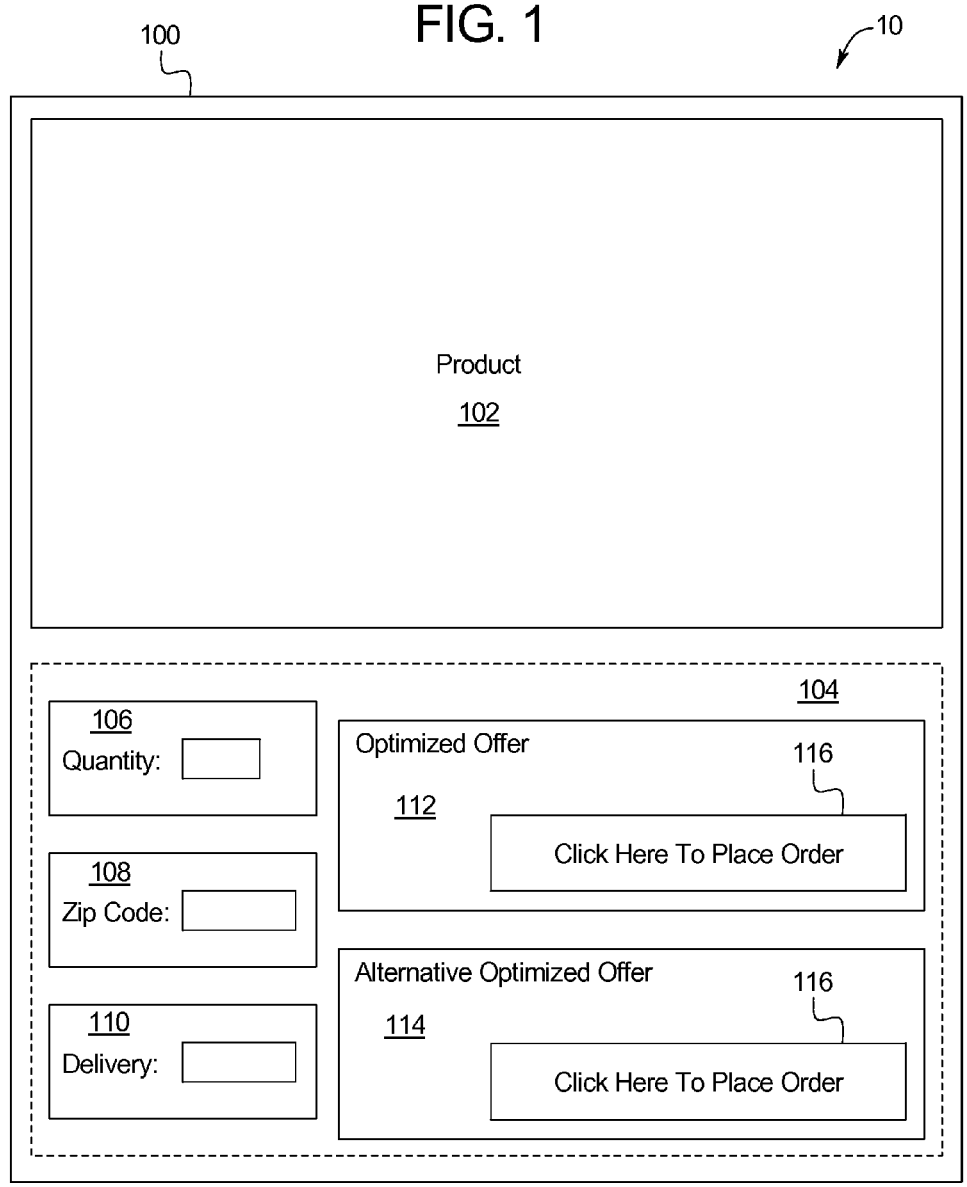

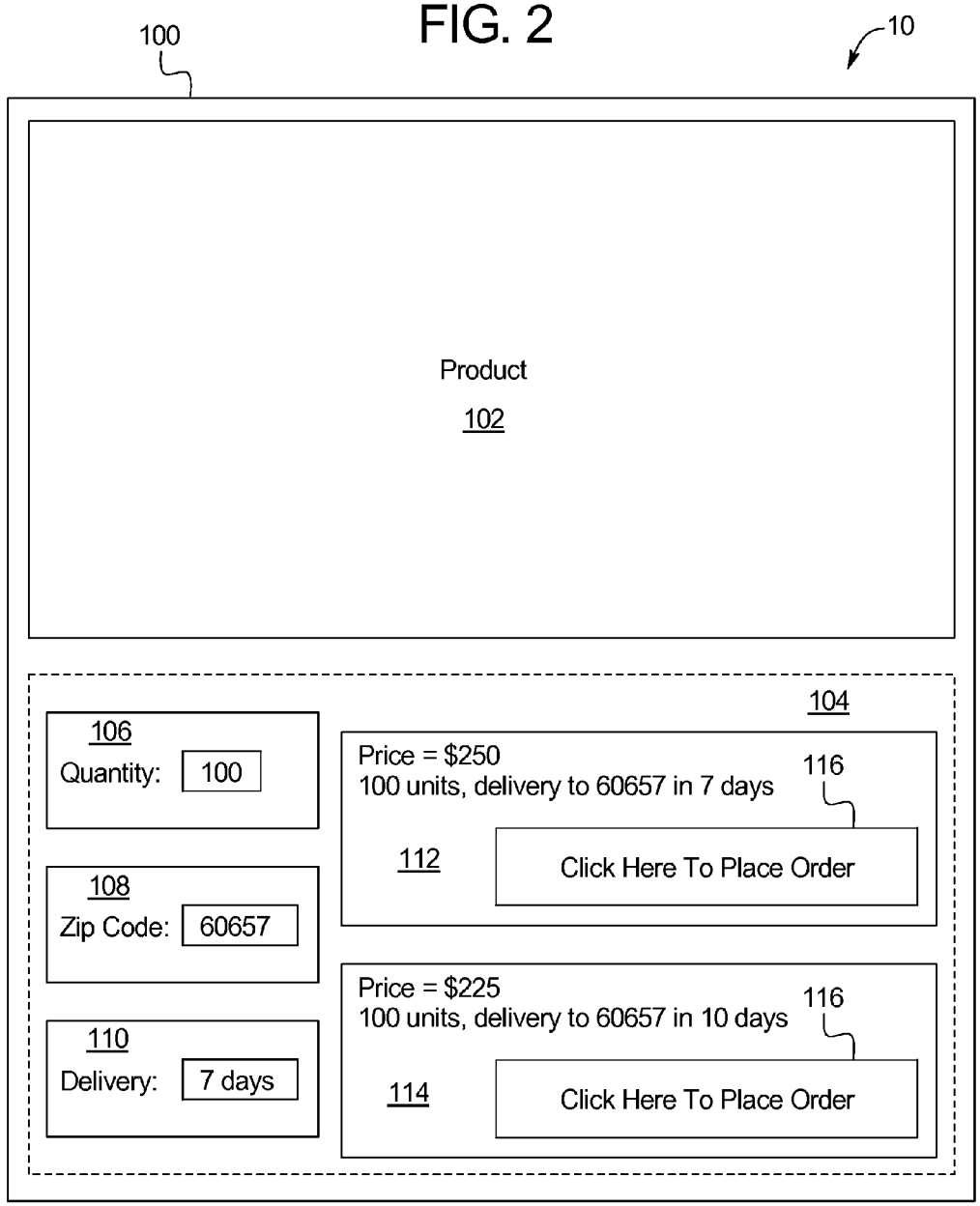

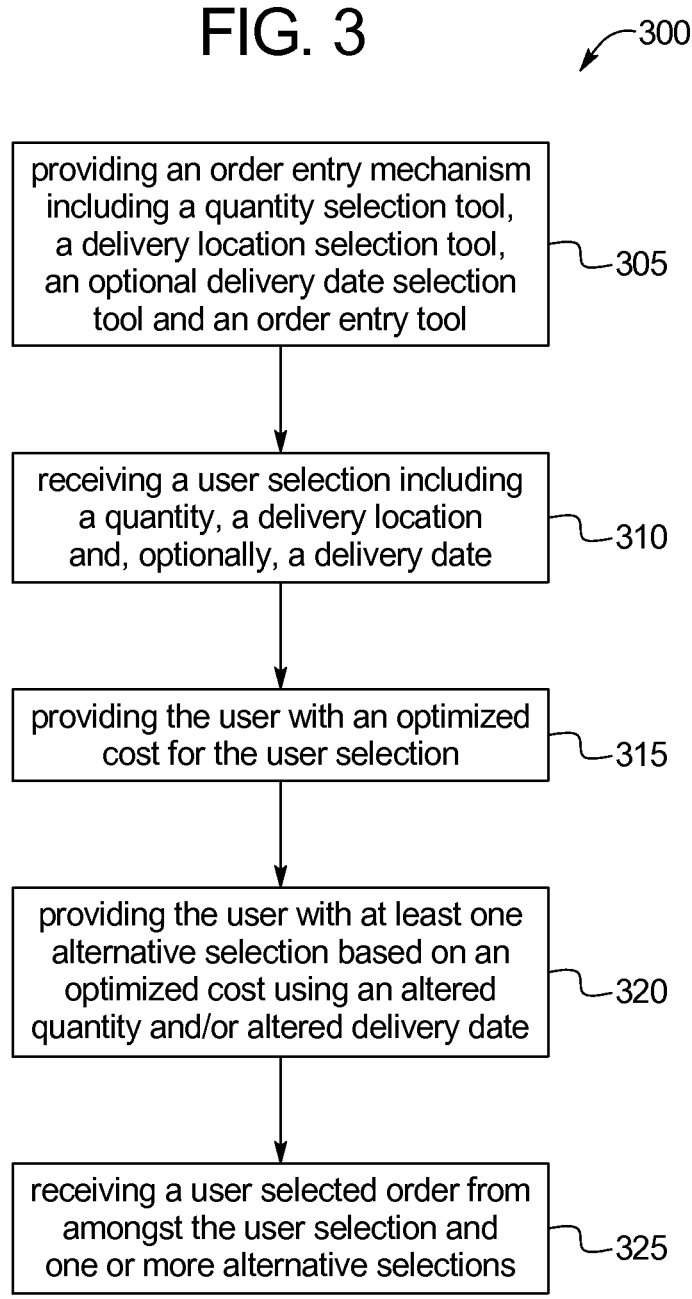

US 8,577,738 B2

METHOD AND SYSTEM OF PROVIDING AN OPTIMIZED OFFER

BACKGROUND OF THE INVENTION

The present invention relates generally to an ecommerce order optimization tool based on quantity ordered, delivery location and, optionally, delivery date requested. Particularly, the present invention relates to a system and method for optimizing the combination of production schedule and shipping method to minimize price for a given delivery date for customized promotional products and other custom or non-stock goods.

Ecommerce tools typically provide a user with a selection of a quantity of a given product and, often, a shipping method. These systems lack efficient tools for allowing a customer and vendor to optimize the production schedule and delivery schedule to deliver non-stock goods to the customer on a selected delivery date for an optimal price.

For example, the typical ecommerce site for ordering custom goods allows users to select amongst a plurality of order options related to production schedule (e.g., standard production, rush production, etc.) and delivery methods (e.g., ground shipping, two day shipping, overnight shipping, etc.), from which a price is calculated. While useful, these systems do not allow for efficient optimization of the production and delivery schedules and further do not provide an easy mechanism for evaluating alternate combinations of delivery dates and order quantities.

Accordingly, there is a need for a system, method, and product that provide a customer and vendor to optimize the production schedule and delivery schedule to deliver non-stock goods to the customer to a selected location on a selected delivery date for an optimal price.

BRIEF SUMMARY OF THE INVENTION

The subject matter provided herein addresses these issues by providing a system and method for efficiently optimizing the combination of production schedule and delivery schedule to deliver customized promotional products and other custom and non-stock goods at an optimized price.

As used herein, production schedule is the time it takes for a vendor to produce or acquire a non-stock item (e.g., custom-made, custom-ordered, etc.). Typically, non-stock items may be acquired on any of a variety of production schedules (e.g., standard production, rush production, etc.), with the shorter the production schedule, the more costly the production. For example, a vendor may have two possible production schedules for a particular item; a standard seven day production schedule at a standard price and a rush two day production schedule at a premium price.

As used herein, delivery schedule is the time it takes for a vendor to deliver an item to a customer. Typically delivery may occur using any of a number of various delivery schedules (e.g., standard ground, two day shipping, overnight shipping, etc.). Similar to production schedule, it is often the case that the quicker the delivery schedule, the more costly the delivery.

One of the advantages presented by the present subject matter is that it provides a tool for assisting customers appropriately balance the cost of production schedule and delivery schedule to optimize their cost. Importantly, the tool helps the customer overcome the natural bias to choose a longer production schedule and shorter delivery schedule, particularly since it is typically more expensive to expedite shipping than it is to shorten the production schedule.

One embodiment of the present invention is an ecommerce tool for optimizing the delivered price of a non-stock item placed through an automated order placement system. The ecommerce tool includes an order placement mechanism providing a quantity selection tool, a delivery location selection tool, a delivery date selection tool and an order placement tool. By allowing the customer to select the quantity, delivery location and delivery date and allowing the vendor to control the production and delivery schedule, an optimized price may be offered to the customer. In addition, the ecommerce tool may be adapted to provide alternatives to the user selection based on alternative values of delivery date and/or order quantity.

A further example of the present invention is a method of optimizing the delivered price of a non-stock item placed through an automated order placement system. The method may include the steps of: providing an order placement mechanism including a quantity selection tool, a delivery location selection tool, a delivery date selection tool and an order placement tool; receiving a user selection including a quantity and a delivery date; providing the user with an optimized cost for the user selection; optionally, further providing the user with at least one alternative selection based on an optimized cost using an altered quantity and/or altered delivery date; and receiving a user selected order from amongst the user selection and one or more alternative selections.

The first two examples provided use a combination of quantity, delivery location and delivery date in the price optimization. However, it is contemplated that alternative embodiments of the system may use only two of the three values, for example, quantity and shipping location. In such an example, the system may return an optimized price based on all delivery dates available for the combination of quantity and shipping location. Several alternatives may be provided to the user illustrating optimized totals for various possible delivery dates, as well as alternate quantities. For example, an optimized price based on quantity and shipping location may include three separate price offerings based on three different delivery dates, as well as include additional price offerings based on increasing or decreasing the quantity of the order to lower the unit cost.

The ecommerce tool may be embodied in any number of electronic systems, for example, websites, mobile applications, etc. Although the examples used herein focus on website applications, it is understood that website are merely one example of systems in which the ecommerce tool may be embodied.

In one example, the ecommerce tool is provided in a website. The website includes a quantity selection tool (e.g., input field to receive the user's selection for the order quantity), a delivery location selection tool (e.g., input field for receiving the user's selection for the order delivery location), and an optional delivery date selection tool (e.g., input field to receive the user's selection for the order delivery date). The user inputs the selections for the quantity, delivery location and delivery date and the ecommerce tool uses that information, along with cost information related to the production schedule and delivery schedule. In other words, when the user selects the number of units to purchase, where the units are to be delivered and the date by which the user wishes to posses the units, the ecommerce tool will optimize the combination of production schedule and delivery schedule to provide an optimized cost to the user. The user may then place the order through the order placement tool (e.g., input mechanism for confirming an order).

In another example, the website may further provide the user with one or more alternative selections based on an optimized cost using an altered quantity and/or altered delivery date. For example, the user may select 100 units for delivery in 7 days for $250 and the ecommerce tool may provide a first alternative of 100 units for delivery in 10 days for $225, a second alternative for 150 units for delivery in 7 days for $325 and a third alternative of 150 units for delivery in 10 days for $300. The user may then select from amongst the user selection and one or more alternative selections or may enter a new user selection and receive additional alternative selections.

In one embodiment, an ecommerce cost optimization system includes: a display component for displaying information identifying an item; a quantity selection tool responsive to a user input to select a quantity of the item; a delivery location selection tool responsive to a user input to set a delivery locations for the selected quantity of the item; an optimized offer presentation tool responsive to the quantity selection tool and the delivery location selection tool that provides at least one optimized option through the display component, wherein the at least one optimized option is optimized based on the selected quantity and the selected delivery location; and an order placement tool responsive to a user input to place an order from amongst the options provided by the optimized offer presentation tool. The at least one optimized option may be optimized by comparing the possible combinations of production schedule and delivery schedule to determine an optimized option. The optimized option may be optimized based on price or delivery date.

Further, it is contemplated that the system and method provided herein may be adapted such that the customer enters a fixed budget into the order placement mechanism and one or more optimized offers are provided based on variations in quantity, delivery date and/or delivery location. For example, the customer may submit a fixed budget of $500 and the system and/or method may provide one or more optimized prices offering a quantity of product, delivered to a location by a given delivery date for a price equal to the fixed budget.

The ecommerce cost optimization system may further include a delivery date selection tool responsive to a user input to select a delivery date. In such an embodiment, the optimized offer presentation tool may be responsive to the quantity selection tool, the delivery location selection tool and the delivery date selection tool to provide at least one price optimized option through the display component, wherein the at least one price optimized option is optimized based on the possible production schedules of the selected quantity and the possible delivery schedules to the selected delivery location.

The ecommerce cost optimization system may further include an alternative offer presentation tool that provides, through the display component, at least one alternative option to the optimized option and further wherein the order placement tool is responsive to a user input to place an order from amongst the options provided by the optimized offer presentation tool and the alternative offer presentation tool. The alternative option is based on an increase in quantity compared to the selected quantity, on a later delivery date than the optimized option or another alternative combination.

An embodiment of a method of providing optimized offer for non-stock item transactions through an ecommerce application, includes the steps of: providing an order placement mechanism including a quantity selection tool, a delivery location selection tool and an order placement tool; receiving a user selection including a selected quantity of the item and a selected delivery location; determining an optimized offer based on analysis of the possible combinations of a production schedule and a delivery schedule for the selected quantity and delivery location; and providing the user with at least one optimized offer based on the selected quantity and the selected delivery location. Finally the method may further include the step of receiving a user selected order from amongst the user selection and one or more alternative selections.

The optimized offer may be optimized based on budget, price or delivery date. The order placement mechanism may further include providing a delivery date selection tool through which a user selection further includes a selected delivery date may be received. The step of determining an optimized offer may then be further based on the selected delivery date.

The method may further including the step of providing at least one alternative option to the optimized option. The alternative option may be based on an increase in quantity compared to the selected quantity, on a decrease in quantity compared to the selected quantity or another alternative combination.

It is further contemplated that in some embodiments of the system and method, the delivery location may be an additional variable. This may be useful, for example, when the customer has more than one location (e.g., two corporate offices) and is open to receiving delivery at any location. Accordingly, in that scenario, varying the delivery location, in combination with the production schedule and delivery schedule may provide the optimal order for the customer.

It is therefore an advantage of the invention provided herein to provide a product, system, and method that assists a consumer, shopping in an ecommerce system, with optimizing the costs to purchase a custom product.

It is another advantage of the invention provided herein to optimize and reduce the cost for a vendor of an ecommerce system to fulfill an order.

It is yet another advantage of the invention provided herein to provide a vendor, operating an ecommerce system, with a system, method, and product to optimize the combination of production and delivery of an order placed through the system.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 illustrates an example of ecommerce price optimization tool for non-stock goods.

FIG. 2 illustrates the ecommerce tool of FIG. 1, in response to a user's entry of quantity, delivery location and delivery date, wherein the ecommerce tool provides an alternative quantity and delivery date combination.

FIG. 3 is a flow chart illustrating a method of optimizing the price of a non-stock order based on user inputs of quantity, delivery location and delivery date and further based on production schedule costs and delivery schedule costs.

DETAILED DESCRIPTION OF THE INVENTION

A preferred embodiment of the present invention is a cost optimization system suitable for use in an ecommerce system.

For purposes of illustration, the preferred embodiments described herein are shown with respect to an ecommerce website (herein referred to as the Vendor Website) offered by a custom products vendor (here referred to as Vendor), which serves as an exemplary ecommerce website; however it is thought to be understood that the principles set forth herein may be applied to any suitable ecommerce tool, whether embodied in a website, a mobile application or any other electronic tools, not simply just variations of the Internet based websites primarily described herein. The system, a preferred embodiment described and shown herein, is described herein and in all corresponding figures with reference number 10.

The system 10 may be implemented with at least one computer programmed to support the functions of the system 10 described herein. In some implementations of the present system 10, more than one computer may be used, where each computer is programmed to support the functions described herein. Such computer(s) may be general purpose computers, such as a desktop computer utilized by a customer wishing to access the website of an ecommerce vendor, where the customer seeks to purchase a specific quantity of a product that is to be delivered by a specific date. However, it is contemplated that any suitable computer may be used in the present system 10, where any suitable computer includes any computer that is capable of being programmed to support functions of the present system 10. Such computers include, but are not limited to, desktop computers, laptop computers, netbooks, cellular phones, smart phones, PDAs, and the like. Further, the present system 10 is not limited to a particular operating system used by any such computer, nor by a particular programming language used to program the computer to necessary to support the functions of the present system 10.

Generally, the present system 10 is contemplated to be used on one or more computers, utilized by a user of the present system 10, in communication with one or more computers operated for an ecommerce website implementing an ecommerce system. Communication between the two computers preferably occurs via the internet, but it is contemplated that such communication may occur in any suitable manner using any suitable means for communication. Such means for communication by the two computers may, for example, occur via a local-area network (LAN), wide-area network (WAN), virtual private network (VPN), cellular network, ethernet connection, USB connection, Bluetooth®, or any other suitable communication structure. The precise method of communication used between the various computers is not intended to be limiting, nor is the communication protocol used by the various computers. The present invention is limited only by the claims presented herein, and not by exemplary functionality or hardware described herein.

The functions described herein with respect to system 10 are supported by two programmed computers. One computer (herein referred to as Customer Computer) is programmed to allow a user (herein referred to as Customer) to use invention embodied in system 10, which includes the Vendor's ecommerce system (herein referred to as Vendor System). The Vendor System provides the necessary ecommerce functions to support the Vendor Website. The other computer (herein referred to as Vendor Computer) is programmed to provide the functions for Vendor Website used by the Customer to access the Vendor System. The two computers, the Customer Computer and the Vendor Computer are operable to communicate with one another via the internet, utilizing known internet communication protocols. Their communication with one another is facilitated by each computer, which supports access to the Vendor Website, where the Vendor Computer provides the Customer Computer with information and functionality for accessing the Vendor System, and the Customer Computer provides the Vendor Computer with instructions and information for accessing the Vendor System. The Customer Computer is operably programmed to display and provide access to the Vendor Website, where the Customer Computer displays the information from the Vendor's Website in a browser (e.g., FireFox or Internet Explorer), well-known in the art of computer programming applications, which is a computer program application that provides access to view and control access to a website. The browser contains a browser screen, which serves as the means by which Vendor Website is presented.

FIGS. 1 and 2 each represent a browser screen in accordance with the preferred embodiment of the present invention, where each is a representation of a browser screen displayed by the Customer Computer in the system 10. FIG. 1 shows an Internet browser screen 100 representing a preferred embodiment of the system 10. Turning now to FIG. 1, the Internet browser screen 100 includes a display for a selected product 102 offered for sale by the Vendor. The product 102 may represent any physical, tangible consumer product, particularly custom made or other non-stock items. The image in FIG. 1 represents a screen shot of a first browser screen 100 displaying the product 102 offered for sale by the Vendor.

In this example, the Internet browser screen 100 includes the product 102 selected by the Customer. In the example shown in FIG. 1, the Internet browser screen 100 provides an order placement mechanism 104 including a quantity selection tool 106, a delivery location selection tool 108, a delivery date selection tool 110, an optimized offer presentation tool 112, an alternative offer presentation tool 114 and an order placement tool 116. The controls shown and described in the system 10 shown with respect to FIGS. 1 and 2 serve as one example of a website based embodiment of the system 10. It is know there are numerous variations in which the system 10 may be embodied.

The quantity selection tool 106 accepts an input value from the Customer representing the quantity desired for the selected product. The quantity selection tool 106 may be any form of quantity selection tool 106, whether a text input field, a drop down menu quantity selector, a sliding quantity selector, etc.

The delivery location selection tool 108 accepts an input value from the Customer representing the destination of the delivery location. In one example, the delivery location selection tool 108 uses the zip code of the delivery destination. In another example, the complete shipping address is required. Accordingly, the delivery location selection tool 108 may be adapted to provide the appropriate interface for entering the required information.

The delivery date selection tool 110 provides an input control that allows the Customer to specify the date by which the Customer is to receive delivery of the selected order. In the embodiment shown, the delivery date selection tool 110 uses a calendar through which the Customer provides a selected date. However, other embodiments may provide other mechanisms for inputting the delivery date information.

Turning now to FIG. 2, after the Customer enters the quantity of product via the quantity selection tool 106, the delivery location via the delivery location selection tool 108 and the delivery date via the delivery date selection tool 110, the Internet browser screen 100 updates to provide an optimized offer to the Customer via the an optimized offer presentation tool 112. As shown in FIG. 2, the optimized offer presentation tool 112 presents the Customer with a price for ordering the quantity of product selected for delivery to the specified delivery location by the designated delivery date.

The Customer may then accept the order via the order placement tool 116. In the example shown in FIGS. 1 and 2, the order placement tool 116 is a button selector through which the user may accept the optimized offer presented by the optimized offer presentation tool 112. As with the other tools and mechanisms described herein, the example shown is merely one embodiment of the order placement tool 116 and it is understood that there may be any number of other mechanisms through which the features and functions may be provided to the Customer.

As further shown in FIG. 2, in response to the Customer's entry the quantity of product, the delivery location and the delivery date the alternative offer presentation tool 114 provides additional, alternative, optimized offers to the Customer, any one of which may be selected by the Customer via the order placement tool 116. Each of the optimized cost alternatives provides an optimized offer based on some variation of the quantity and/or delivery of the selected product. For example, lower cost offerings may be based on extending the delivery date or lowering the order quantity compared to the information provided by the Customer. Additional alternatives may provide a lower unit cost (even if increasing the total cost) by increasing the order quantity. Each optimized offer alternative may be displayed such that the user may make a selection via the order placement tool 116.

Using the examples of the order placement mechanism 104 provided in FIGS. 1 and 2, FIG. 3 is a flow chart illustrating a method 300 of providing an optimized offer for non-stock item transactions through an ecommerce application (the "method 300"). As shown in FIG. 3, the method 300 includes the steps of: providing an order placement mechanism 104 including a quantity selection tool 106, a delivery location selection tool 108, an optional delivery date selection tool 110 and an order placement tool 116 (step 305); receiving a user selection including a quantity, a delivery location and, optionally, a delivery date (step 310); providing the user with an optimized cost for the user selection (step 315); optionally, further providing the user with at least one alternative selection based on an optimized cost using an altered quantity and/or altered delivery date (step 320); and receiving a user selected order from amongst the user selection and one or more alternative selections (step 325).

In one example, in the first step 305, the Vendor may provide an order placement mechanism 104 including a quantity selection tool 106, a delivery location selection tool 108, a delivery date selection tool 110 and an order placement tool 116 embodied in a website. The website enables the Customer to input the quantity of the product desired through the quantity selection tool 106, the location to which the product is to be delivered via the delivery location selection tool 108 and set the date by which the product is to be delivered via the delivery date selection tool 110.

The Customer selections are then made through the order placement mechanism 104 and communicated to the Vender System in the second step 310. In this example, the user selects 100 units of a given product for delivery to zip code 60657.

Upon receipt of the user selection, the Vender System evaluates the various production schedule options and the various delivery schedule options to determine the optimum combination to meet the Customer's order requirements. For example, with a seven day delivery, the production of the product may take six days and the delivery may take one day. Alternatively, the production may be two days and the delivery may take five days. By analyzing the possible combinations of delivery dates, production schedules, delivery schedules and related costs, an optimized offer may be determined. The optimized offer may then be presented to the Customer via step 315. Step 315 may be accomplished, for example, via an optimized offer presentation tool 112. In this example, the optimized offer may be, for example, delivery of 100 units in seven days for $250.

FIG. 3 further illustrates the optional step of providing the user with at least one alternative selection based on an optimized cost using an altered quantity and/or altered delivery date in step 320. In this example, the first alternative provided by the Vender System may be for the order of 100 units for delivery in ten days for $225. A second alternative offer may be for 150 units for delivery in seven days for $325. A third additional alternative may be for 150 units for delivery in ten days for $300. The alternative optimized offers may be presented, for example, via an alternative offer presentation tool 114. Although only one alternative is shown in FIG. 2, it is understood that any number of alternatives may be presented to the Customer. The step (230) of providing the user with at least one alternative selection based on an optimized cost using an altered quantity and/or altered delivery date, may be a useful tool for upselling additional volume of the product 102 to the user by presenting options such as: "buy 20 more and save X %;" or "buy 20 more and save $X." Similarly, the alternative selection may be useful as a tool for providing a lower cost option to the customer, for example by limiting the quantity or extending the delivery date.

Finally, the Customer may make a selection via the order placement tool 116 which allows the Vender system to receive the user selected order from amongst the user selection and one or more alternative selections in step 325.

The examples provided above with respect to FIGS. 1-3 use a combination of quantity, delivery location and delivery date in the price optimization process. However, it is contemplated that alternative embodiments of the system 10 may use only two of the three values, for example, quantity and shipping location. In such an example, the system may return an optimized price based on all delivery dates available for the combination of quantity and shipping location provided by the user (i.e., every combination of production schedule and delivery schedule). Several alternatives may be provided to the user illustrating optimized totals for various possible delivery dates, as well as alternate quantities. For example, an optimized price based on quantity and shipping location may include three separate price offerings based on three different delivery dates, as well as include additional price offerings based on increasing the quantity of the order to lower the unit cost.

It is contemplated that through the optimized alternatives provided based on various combination of rush (i.e., expedited) production and/or rush delivery, the tools offered herein will be valuable to both customers and vendors.

Further, it is contemplated that the system and method provided herein may be adapted such that the customer enters a fixed budget into the order placement mechanism 104 and one or more optimized offers are provided based on variations in quantity, delivery date and/or delivery location. For example, the customer may submit a fixed budget of $500 and the system and/or method may provide one or more optimized prices offering a quantity of product, delivered to a location by a given delivery date for a price equal to the fixed budget.

It is further contemplated that in some embodiments of the system and method, the delivery location may be an additional variable. This may be useful, for example, when the customer has more than one location (e.g., two corporate offices) and is open to receiving delivery at any location.

Accordingly, in that scenario, varying the delivery location, in combination with the production schedule and delivery schedule may provide the optimal order for the customer. Accordingly, the delivery location selection tool 108 may be provided such that a user may specify multiple alternate delivery locations.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An ecommerce cost optimization system comprising: one or more computers configured with:
    a display component for displaying information identifying an item;
        a quantity selection tool responsive to a user input to select a quantity of the item;
        a delivery location selection tool responsive to a user input to set at least one delivery location for the selected quantity of the item;
        a delivery date selection tool responsive to a user input to select a delivery date for the selected quantity of the item to the selected delivery location;
        an optimized offer presentation tool responsive to the quantity selection tool, the delivery location selection tool, and the delivery date selection tool that, automatically in response to the selected delivery date for the selected quantity of the item to the selected delivery location, provides at least one price optimized option through the display component, wherein the at least one price optimized option is automatically selected from at least two combinations of one or more production schedules and one or more delivery options, wherein each of the combinations meets the selected delivery date for the selected quantity of the item to the selected delivery location; and
        an order placement tool responsive to a user input to place an order from amongst the at least one price optimized option provided by the optimized offer presentation tool.

2. The ecommerce cost optimization system of claim 1 further including an alternative offer presentation tool that provides, through the display component, at least one alternative option to the at least one price optimized option and further wherein the order placement tool is responsive to a user input to place an order from amongst the at least one price optimized option and the at least one alternative option.

3. The ecommerce cost optimization system of claim 2 wherein the at least one alternative option includes an alternative option based on an increase in quantity compared to the selected quantity.

4. The ecommerce cost optimization system of claim 2 wherein the at least one alternative option includes an alternative option based on a later delivery date than the selected delivery date.

5. A method of providing an optimized offer for non-stock item transactions through an ecommerce application embodied in a computer-readable medium capable of execution by a computer, including the steps of:
    providing an order placement mechanism including a quantity selection tool, a delivery location selection tool, a delivery date selection tool and an order placement tool;
    receiving a user selection including a selected delivery date for a selected quantity of an item to at least one selected delivery location;
    automatically in response to receiving the selected delivery date for the selected quantity of the item to the at least one selected delivery location, determining, by an optimized offer presentation tool, a price optimized offer based on analysis of the possible combinations of a production schedule and a delivery schedule for the selected delivery date for the selected quantity of the item to the at least one selected delivery location; and
    providing the user with at least one price optimized offer based on the selected delivery date for the selected quantity of the item to the at least one selected delivery location.

6. The method of claim 5 further including the step of providing at least one alternative option to the at least one price optimized offer.

7. The method of claim 6 wherein the at least one alternative option is based on an increase in quantity compared to the selected quantity.

8. The method of claim 6 wherein the at least one alternative option is based on a later delivery date compared to the selected delivery date.

9. The method of claim 6 further including the step of receiving a user selected order from amongst the at least one price optimized offer and the at least one alternative option.

* * * * *